340-552 SR
12/31/85 OR 4,562,428

United States Patent [19]

Harman et al.

[11] Patent Number: 4,562,428
[45] Date of Patent: Dec. 31, 1985

[54] INTRUSION DETECTOR

[75] Inventors: R. Keith Harman, Kanata; Dale R. Younge, Nepean, both of Canada

[73] Assignee: Senstar Security Systems Corp., Ontario, Canada

[21] Appl. No.: 423,842

[22] Filed: Sep. 24, 1982

[30] Foreign Application Priority Data

May 14, 1982 [CA] Canada .................................. 403015

[51] Int. Cl.[4] ........................ G01B 13/18; G01B 26/00

[52] U.S. Cl. .................................. 340/552; 340/553; 340/505; 340/517; 340/531

[58] Field of Search ........... 340/552, 553, 554, 825.36, 340/506, 517, 505, 518, 531, 825.54, 825.07, 825.1, 825.08; 455/4, 5; 343/5 PD

[56] References Cited

U.S. PATENT DOCUMENTS

| | | | |
|---|---|---|---|
| 3,732,562 | 5/1973 | Faber et al. | 340/505 |
| 3,765,016 | 10/1973 | Bert et al. | 340/517 |
| 4,091,367 | 5/1978 | Harman | 340/552 |
| 4,135,185 | 1/1979 | Rotman et al. | 343/5 PD X |
| 4,213,123 | 7/1980 | Poirier | 340/552 |
| 4,415,885 | 11/1983 | Mongeon | 340/553 X |
| 4,458,240 | 7/1984 | Rittenbach et al. | 340/553 X |

FOREIGN PATENT DOCUMENTS

| | | | |
|---|---|---|---|
| 704779 | 3/1954 | United Kingdom | 340/552 |
| 1424351 | 2/1976 | United Kingdom | 340/552 |
| 2095014 | 9/1982 | United Kingdom | 340/506 |

*Primary Examiner*—James L. Rowland
*Assistant Examiner*—Brian R. Tumm
*Attorney, Agent, or Firm*—Antonelli, Terry & Wands

[57] ABSTRACT

This invention is an intrusion detector which uses codirectionally coupled CW leakly cable sensor techniques. Successive sensors are connected serially through R.F. decouplers, and each is polled and is sent power from a control unit via the serial cables, through the decouplers. The detector thus provides both intrusion detection and a secure data link.

25 Claims, 9 Drawing Figures

INTRUSION DETECTOR

Figure 1:
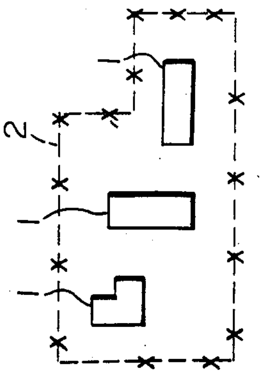

This invention relates to intrusion detectors and particularly to a line or perimeter intrusion detector using a leaky coaxial cable detection technique.

Intrusion detectors are widely used to provide a warning indication that a person or object has passed into a protected zone. Such detectors commonly provide an intrusion indication by means of a disturbed switch, i.e., the weight of a person stepping on a mat switch, the interruption of a light or infrared beam, the detection of vibration as may be caused by the opening of a door or window or movement of the wires of a fence, etc. Another class of intrusion detector involves the use of buried leaky coaxial cables. The cables of a pair are spaced parallel to each other along a line, radio frequency energy higher than e.g. 10 megahertz is transmitted along one cable, and is received in the other. A person or other electromagnetic energy absorbing body coming into the major electromagnetic field changes the coupling between the coaxial cables, resulting in a change of the phase and the amplitude of the received signal. In a system such as that described in U.S. Pat. No. 4,091,367 issued May 23, 1978, invented by Robert K. Harman, the change in received energy is converted into a signal which indicates the location of the intrusion into the field, along the cable.

With the pair of cables buried and passing completely around an area, determination of the location of any passage into or out of the area is effectively obtained. Such systems have wide application for use at penitentiaries, border areas, military air fields, industrial plants, indeed any area or line to which trespass is to be controlled.

In the system according to the aforenoted patent, a pulsed radio frequency signal is used, the time and/or phase delay from the onset of the transmit pulse to the reception of the target being used to locate the target along the cable length. That system in effect is a VHF pulsed bistatic moving target indicator guided radar. However the leaky cable lengths are fixed and a broad bandwidth is required. The use of range gating requires very high speed digital signal processing and very complex circuits. A single failure in either the cable or signal processor can disable at least half if not all of the perimeter security. Since the cable sector lengths are fixed, it is very difficult to integrate this type of sensor with other sensors or to have the sectors coincide with particular site features such as corners and gates. Further, the use of pulse transmission inherently requires use of a broad bandwidth thereby effectively forcing this type of intrusion detector to operate in an unused television channel. Nevertheless the particular point of intrusion is provided to the system operator.

According to the present invention, a continuous wave (CW) signal is used. Use of the CW signal according to this invention cannot provide an indication of the location of an intrusion. Therefore block sensors are used which detects and indicates the presence of a target somewhere within a cable sector. A perimeter or line to be guarded is divided into sectors driven by separate transmitters and receivers. Each unit containing a transmitter and receiver (herein termed as a control terminal for a sector) also contains a detector which determines that the sector has been intruded. The coaxial cables in the successive sectors are connected in series, but are decoupled for radio frequencies in order that the transmitted signal carried in one sector should not interfere with the detection of the transmitted frequency for the next. Preferably adjacent sectors should operate at different frequencies. A control unit is connected to the coaxial cables and polls each of the remote terminals by sending an address signal which passes through the radio frequency decouplers to each of the remote terminals. Upon recognizing its unique address signal, the addressed terminal responds by applying a data signal to the coaxial cable indicating whether its associated sector has been intruded.

The control unit also applies power to the coaxial cables for use by the remote terminals. Preferably the power is in the form of low frequency alternating pulses (e.g. 18-⅓rd hertz). This power is rectified at each of the remote terminals and used for local power. In addition, the change in polarity of the power is used by the remote terminals for timing, for instance to indicate when it should expect an address signal: immediately following the change in polarity and following a debounce interval.

It may now be recognized that the transmission of data signals and/or power down the coaxial cable and the return of an intruder indication data signal provides for the first time a data link which is secure; any approach by an intruder to this data link will immediately provide an indication to the control unit that it may be threatened by the intruder. Thus the invention may be used as a secure data link, in addition to or instead of an area protection device.

Remote sensors or other data signal generating apparatus can be connected to one or more of the remote terminals, the resulting signals of which are carried by the secure data link to the control unit.

In general the present invention is an intrusion detector comprising serially connected leaky coaxial cable intrusion detectors, each connected to but isolated from the next by RF decoupling circuitry, each detector having a centrally connected remote terminal, and a control unit connected to the cables of the serial intrusion detectors. The control unit includes circuitry for applying alternating pulses of power to the leaky coaxial cable. Circuitry at each remote terminal rectifies the power to obtain DC operating power thereby.

The invention is also an intrusion detector comprising serially connected leaky coaxial cable intrusion detectors, each connected through but isolated from the next by RF decoupling circuitry, each detector having a centrally connected remote (controlling) terminal, and circuitry for transmission of intrusion signals from each remote terminal to the control unit via the coaxial cable through the RF decoupling circuitry. A secure data link is thereby provided whereby externally supplied data signals can be passed along the coaxial cable through the decoupling means, and any threat to the data link caused by an intruder thereby being immediately indicated to the control unit.

According to the preferred embodiment of the present invention in each sector CW radio frequency energy is transmitted along one cable and a receiver is connected to the adjacent end of the parallel cable. For this case, a graded cable or large diameter coaxial cable must be used. In order to ensure that the signal from one sector will not affect the field, and the determination of an intrusion to the adjacent sector, with the remote terminal centrally located in a sector, signals are transmitted in synchronism with respect to all remote terminals in one direction (i.e. to the right), then are switched to the left side cables. Thus one-half of each sector is sensed during each time interval. The switching time is synchronized to the power pulse frequency transmitted along the coaxial cables from the control unit. The entire sector is sensed during one 360 degree power cycle.

More particularly, the intrusion detector is comprised of a control unit, a plurality of remote terminals spaced along a line to be protected, each of the terminals including a radio frequency transmitter and receiver, a pair of coupled leaky coaxial cable pair units associated with each terminal, one cable of the pair connected to the transmitter and one cable of the pair connected to the receiver, and circuitry at each terminal for detecting a predetermined variation in the transmitted signal received at the receiver caused by the intrusion of a body adjacent the cables and changing the coupling therebetween, and for generating an intrusion detection signal in response thereto. The receiver, transmitter, detection circuitry and pair of cable pair units form a segmental intrusion detector. The cable pair units are connected serially at each of the terminals, between each of the sectors, along the line to be protected, and to the control unit, the connections being made through radio frequency decoupling circuitry such as low pass filters. Circuitry is provided for applying a data signal from the control unit to the cable units including a remote terminal address for passage through the decoupling circuitry and reception by the remote terminals. Each remote terminal includes circuitry for detecting the remote terminal address and for applying the intrusion detection signal and other signals to the cable for passage through the decoupling circuit and for reception by the control unit, upon the address matching a predetermined address at the corresponding remote terminal. Circuitry at the control unit receives the intrusion detection signal and provides an indication that an intrusion has been detected within a particular segment in response to the reception of the intrusion detection signal. Preferably the indication is made on a cathode ray tube which graphically portrays the area or line to be protected. An intrusion of a particular sector preferably should be indicated by that sector having a change in color, flashing, etc.

Figure 2:
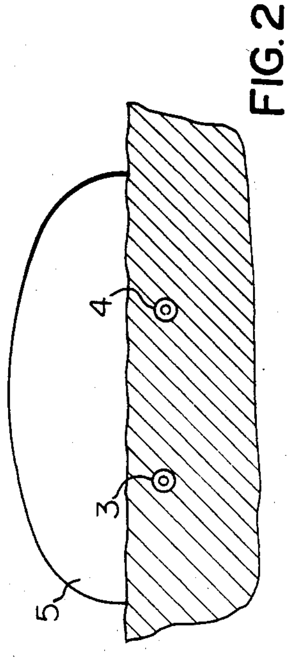
Figure 3A:
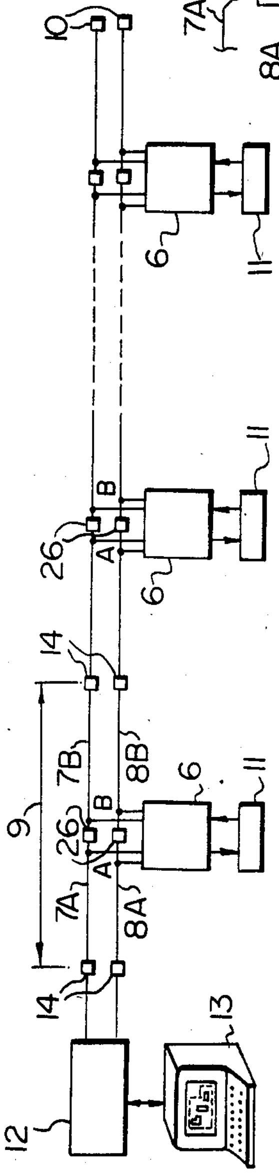
Figure 3B:
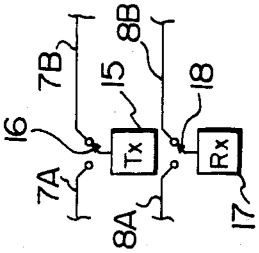
Figure 4:
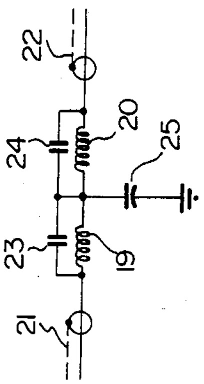
Figure 6:
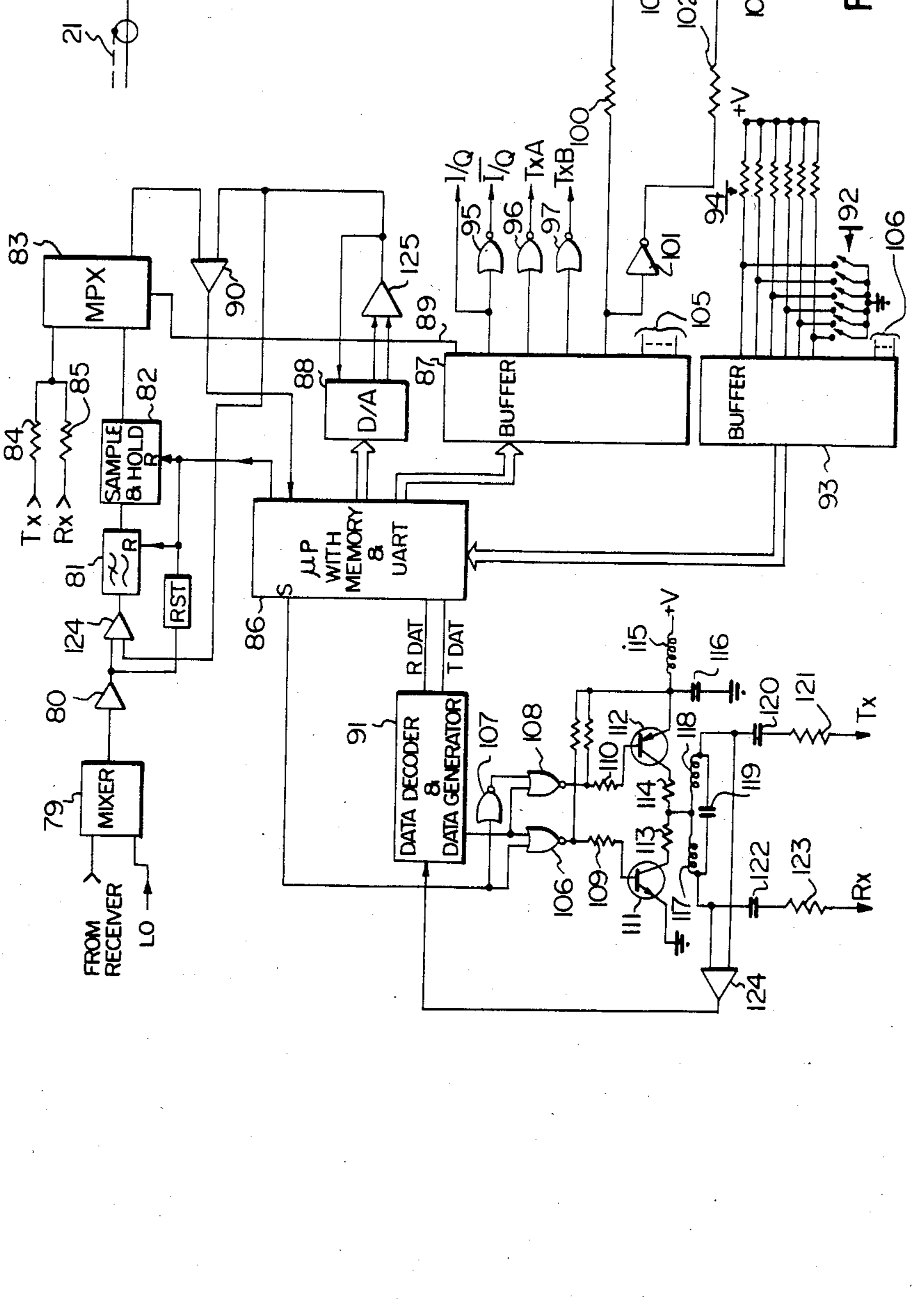
Figure 5:
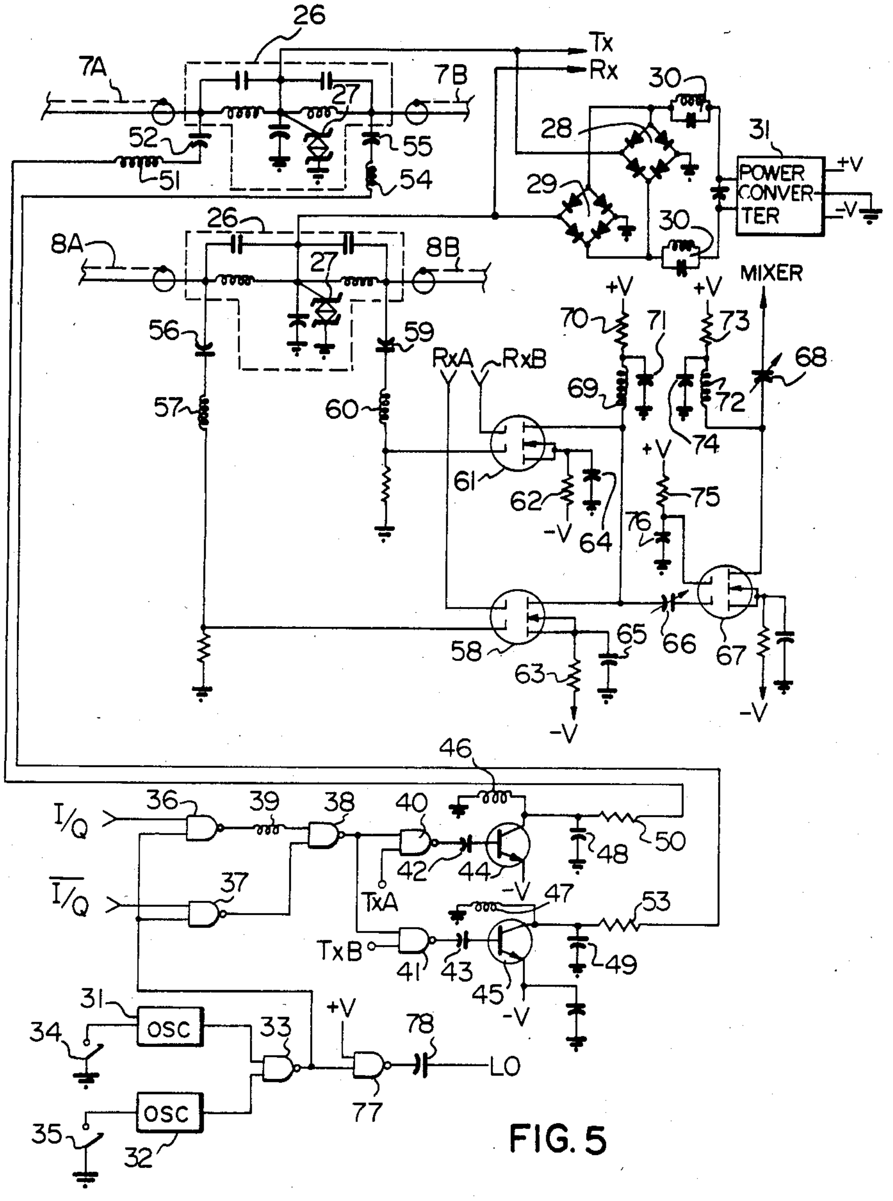
Figure 7:
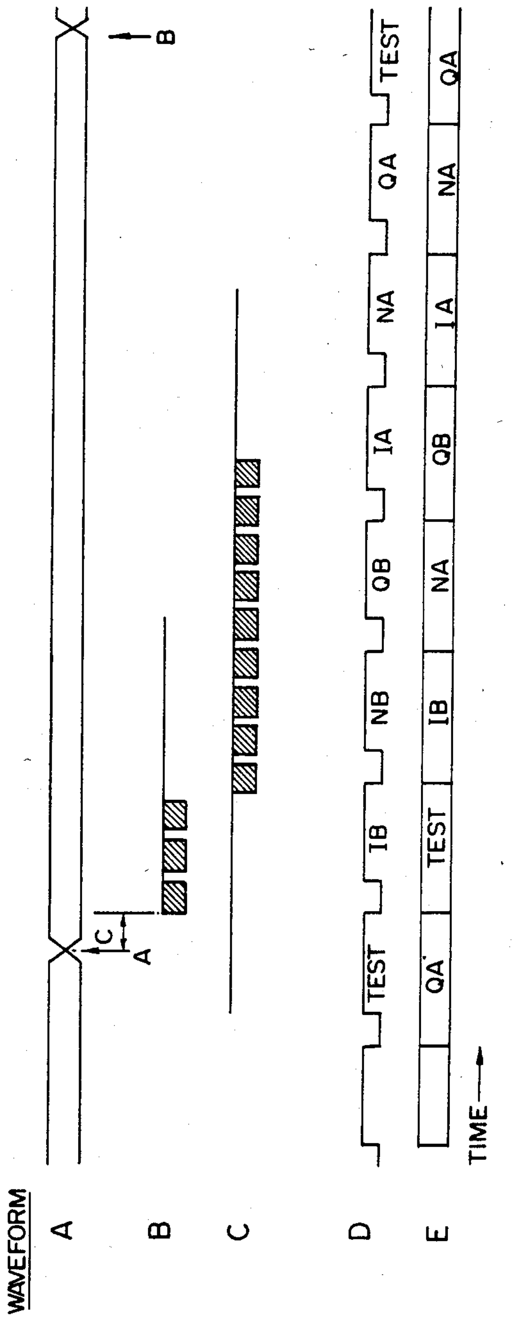
Figure 8:
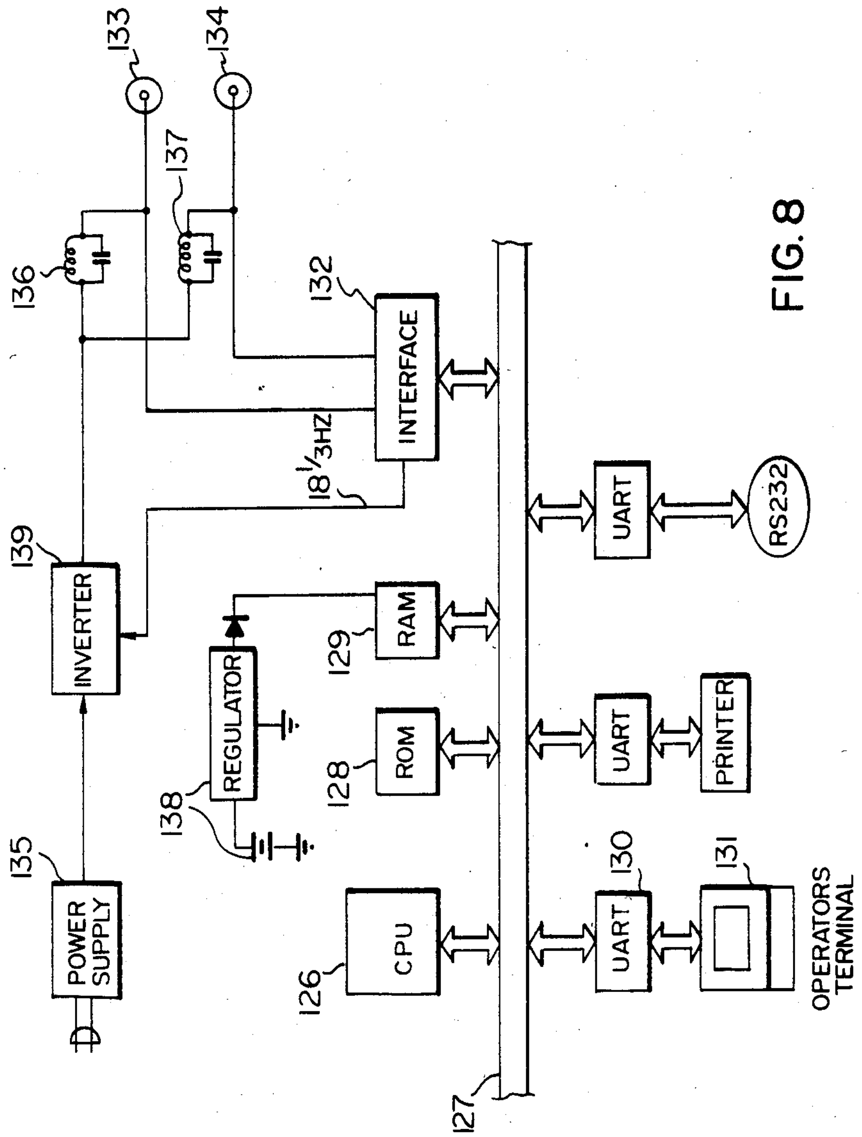

A better understanding of the invention will be obtained by reference to the detailed description below, with reference to the following drawings, in which:

FIG. 1 is a view of a display showing a typical area to be protected by an intrusion detector, FIG. 2 is a sectional view of a pair of leaky coaxial cables in use, FIG. 3A is a block diagram illustrating the invention, FIG. 3B is a functional block diagram of a portion of a remote terminal used in the invention, FIG. 4 is a schematic diagram of a tee filter for use in the invention, FIG. 5 is a schematic diagram of a portion of a remote terminal of the invention showing the transmitter, receiver, power take-off and data receive and transmit connection points to the coaxial cables of the invention, FIG. 6 is a partially block diagram and partially schematic diagram of the control portion of a remote terminal of the invention, FIG. 7 are waveform and timing diagrams, and FIG. 8 is a block diagram of a control unit for use with the invention.

Turning to FIG. 1, a plan view is shown of a typical area to be protected using this invention, as would be shown on a display. A perimeter intruder detection system 2 is installed around a group of buildings 1. The system according to the present invention is divided into sectors, demarcated by each "X".

According to the prior art system described in U.S. Pat. No. 4,091,367, a pair of spaced buried cables pass completely around the area along the perimeter, the pulse transmitter and receiver being located together at a single control position. Any intruder passing across the cables affects the coupling between the leaky coaxial cables and the receiver indicates after performing a complex calculation on the signal where along the perimeter the intrusion occurs.

According to the present invention rather than using a pulse form of transmitted signal, a continuous wave signal is used. A determination of the position of an intruder along the cable cannot be made using the CW (although the presence of an intruder can be detected), but in the present invention separate intruder detectors are used for each sector, each with its own transmitter and receiver. Consequently an intruder passing into the region of any sector will provide an indication that that particular sector has been violated.

In both the prior art and in the present system, a pair of leaky coaxial cables 3 and 4 are spaced parallel to each other and are buried as shown in FIG. 2. The structure of such leaky cables is described in the aforenoted U.S. patent and thus need not be described further. However suffice to say that an electromagnetic field region 5 is set up above ground which is disturbed if an intruder passes within it. The effective height of the field typically would be 4 feet or more.

According to the preferred form of the present invention, both the transmitter and receiver are connected to the adjacent ends of the two parallel cables. Consequently a graded leaky cable should be used in order to equalize the attenuation over the length of the sector to be protected. Alternatively, a large diameter leaky coaxial cable can be used to minimize the attenuation. However, the concepts of the present invention can be accommodated with cable pairs having the transmitter at one end of one cable of the pair and the receiver at the other end of the other cable of the pair, if the application of the design so requires.

FIG. 3A is a block diagram illustrating the basic concepts of the present invention. A plurality of remote terminals 6 are spaced along a line to be protected. A pair of cables 7A and 8A corresponding to cables 3 and 4 of FIG. 2 are buried along each sector 9 to be protected. The full length of sector 9 is protected by means of a second pair of cables 7B and 8B; the relationship of cables 7A and 7B, and 8A and 8B will be described in more detail below.

It may be seen that each remote terminal 6 controls the preferably graded parallel coaxial cables along a sector 9. Serially connecting the cables to cables associated with the next remote terminals and so on, protects the entire line or perimeter of an area. The cables are terminated at the end of the line to be protected by load resistors 10.

Each of the terminals 6 may have a plurality of external devices 11 (auxiliary signal generating means) connected to it. The external devices may be vibration sensors or other detectors or signal receiving ports for receiving signals from external data signal generating apparatus.

A head end control unit 12 is connected to one end of the cables, although it may be located at any other end position of any sector at a remote terminal. A display device 13, preferably containing a cathode ray tube for graphically showing the line or area to be protected (e.g. as in FIG. 1) is connected to the control unit. However it should be noted that the display device can be an alphanumeric readout or some other suitable display.

Each remote terminal contains a transmitter and a receiver. According to the preferred embodiment a CW signal of typically 40 megahertz (which can be extremely narrow band) is applied to one of the leaky coaxial cables and the signal is received from the other. In order that the transmitted signal from one sector should not interfere with that of the next, radio frequency decouplers 14 are used, connecting the cables together at the segment junctions and connecting the control unit 12 to the cable. The decouplers, preferably low pass filters, allow data signals and power to be transmitted along the cables between the control unit and the remote terminals and data signals in the reverse direction. Preferably each alternate signal is of different frequency.

With a CW signal constantly on one of the cables, its field would clearly interfere with the field of the next cable within a sector. Consequently the transmitter and receiver of each terminal are connected to the cables to one side of the sector for a first period of time and then are switched to the cables to the other side. For example, as shown in FIG. 3B, the transmitter 15 is connected to cable 7B via switch 16 while receiver 17 is connected to cable 8B via switch 18. During this interval cables 7A and 8A are idle, providing the space of one-half sector between active cables, to the left of transmitter and receiver 15 and 17 respectively. This sufficiently isolates the fields of successive sectors so that they do not interfere.

Transmitter and receiver 15 and 17 are then switched to cables 7A and 8A, idling cables 7B and 8B. Transmitter and receiver 15 and 17 are thus isolated by cables 7B and 8B from the sector to the right. For the purposes of this description, cables 7A and 8A will be referred to as the A side of the sector while cables 7B and 8B will be referred to as the B side of the sector.

In FIG. 3A it is also shown that cables 7A and 7B are connected together through an RF decoupler 26 and cables 8A and 8B are similarly connected together through an RF decoupler 26. These decouplers are of similar construction to decouplers 14 and serve similar purposes, to prohibit the transmitted signals to be carried by both cables 7A and 7B, or 8A and 8B simultaneously, yet to allow power and data signals to pass.

Power is applied to the control unit 12 on both cables in the form of alternating polarity pulses, as shown in FIG. 7, waveform A. The preferred frequency of the power pulses is 18-⅜ hertz, which has been selected so as to avoid being a sub-multiple of commonly used 60 hertz power frequency in North America (or 50 hertz power frequency in Europe). The transmitter and receiver of FIG. 3B are switched to alternate A and B sides of the sector in synchronism with the applied power frequency. In this manner control unit 12 controls the transmitter and receiver switching frequency.

Each remote terminal 6 contains a threshold detector which detects an intrusion within its sector, by sensing variation in the received signal on the cable to which its receiver is connected. Control unit 12 applies a data signal to one of the cables, the data signal being passed through each of the radio frequency decouplers to all remote terminals. The data signal contains an address, and by means of the address each of the remote terminals is polled. The remote terminal detecting its address applies a responsive data signal to the coaxial cable, containing an indication of the number of intrusions, and to what magnitude the intrusion threshold has been exceeded, detected by the control unit 12.

The signal applied to the cable by the remote terminal also can be comprised of signals derived from associated peripheral devices. Indeed, the purpose to which the present invention may be put can be mainly to carry signals from the peripheral devices to a special receiver for such signals, connected to the coaxial cable at the control unit or elsewhere. Since the present invention provides an indication of an approach of a body to the coaxial cables, and since the coaxial cables carry the data signal, the structure forms a secure data link for signals transmitted between the peripheral devices 11 and the signal receiver. Any approach to the data link, which approach could constitute a threat to its security, is indicated on the display device and an alarm can be sounded.

Thus the control unit 12, receiving data signals from the remote terminal 6 as to intrusions within its associated sector 9, translates these signals by conventional techniques to a change in the display and/or an alarm. For example, the color of a segment shown on a color cathode ray tube may change from green to red, may flash, an alarm light or audible indicator may be enabled, etc., alerting an operator to the approach by a body to the data link or perimeter which is guarded.

The radio frequency decouplers 14 and 26 preferably are in the form of low pass filters, such as the one shown in FIG. 4. FIG. 4 shows a conventional tee filter comprising a series pair of inductors 19 and 20 connected between the center conductors of coaxial cables 21 and 22. Inductors 19 and 20 are bypassed by capacitors 23 and 24 respectively, their mutual control junction being bypassed to ground through capacitor 25. The low pass filter preferably is designed to pass frequencies below 10 megahertz. Consequently the 40 megahertz CW signal which is present alternately on cables 21 and 22 is blocked from passing from one cable to the next. Yet power and data signals pass through the decouplers to the ends of the cables.

Turning now to FIG. 5, the transmitter and receiver portions of each remote terminal 6 are shown. Cables 7A and 7B are used to carry the transmitted signal, while cables 8A and 8B are used to carry the received signal, for each sector. Cables 7A and 7B are shown connected together via tee filter 26, and cables 8A and 8B are connected together via a similar tee filter 26.

The center junction of each of the tee filters 26 is connected to ground through a zener diode 27 to protect the electronic apparatus connected to the cables from power surges caused by lightning, etc.

The center junctions of each of the tee filters 26 are also connected to a pair of bridge rectifiers 28 and 29, which are connected through resonant band-stop filters 30, tuned to the dominant harmonic power frequency, to a DC power converter 31. Converter is of conventional construction, and can be for example Tectrol type SP251 power supply which provides power at +V and −V volts at logic levels for the remote terminal.

It is further preferred that each alternate sector transmitter and receiver should operate at a different radio frequency, in order to further avoid interference bewteen sectors. A pair of crystal oscillators, one to be selected, thus can be provided operating for example at about 40 megahertz with 30 kilohertz difference in frequency. Thus oscillators 31 and 32 are provided to supply different frequency signals to separate inputs of NAND gate 33, one or the other oscillator being selectable by means of switch 34 or 35. Consequently upon installation of the system, either oscillator 31 or 32 is selected by means of the operation of switch 34 or 35, to provide different frequency signals to adjacent sectors.

The selected output signal of NAND gate 31 is applied to one of the inputs of NAND gates 36 and 37. The second input of NAND gate 36 is connected to a lead labelled I/Q and the second input of NAND gate 37 is connected to a lead labelled I/Q. The output of NAND gate 37 is connected to one input of NAND gate 38, while the output of NAND gate 36 is connected through an inductor 39 to the other input of NAND gate 38. Inductor 39 should be of inductance to provide a 90° phase shift to the signal passing through it.

The approximately 40 megahertz signal output from NAND gate 33 is thus applied to both NAND gates 36 and 37. With the application to an input I/Q enable input to NAND gate 36, the gate is inhibited and the oscillator signal passes through gates 37 and 38. However if instead an enable signal is applied to the I/Q input of NAND gate 37, the 40 megahertz oscillator signal passes through NAND gate 36, is phased retarded by 90°, and passes through NAND gate 38. Consequently by the application of a logic signal to either the I/Q or I/Q inputs to NAND gates 36 or 37, and in-phase or quadrature shifted oscillator signal is passed through NAND gate 38.

The resulting output signal of NAND gate 38 is applied to one input of both NAND gates 40 and 41. The second inputs to gates 40 and 41 are connected to leads TXA and TXB respectively. Consequently with logic enable signals applied to either of those inputs, the selected NAND gate passes the applied in-phase or quadrature shifted oscillator signal applied to it.

The outputs of NAND gates 40 and 41 are connected through capacitors 42 and 43 to the base inputs of high frequency power transistors 44 and 45 respectively. The collectors of transistors 44 and 45 are connected to ground via inductors 46 and 47 bypassed by capacitors 48 and 49 respectively in a well known manner. The emitters of transistors 44 and 45 are connected to supply voltage −V.

The collector of transistor 44 is connected through resistor 50, inductor 51, and capacitor 52 in series to the center conductor of coaxial cable 7A, while the collector of transistor 45 is connected via resistor 53, inductor 54 and capacitor 55 to the center conductor of coaxial cable 7B.

Thus it may be seen that with the application of a logic enable signal to one of leads TXA or TXB, the in-phase or quadrature shifted radio frequency signal generated by oscillator 31 or 32 can be switched to either cable 7A or 7B.

At the same time, alternating pulses of power passing from the control unit down the cable passes directly through low pass tee filter 26 from cable 7A to 7B, and is tapped, rectified and is used to power the local terminal. Similarly, data signals having a frequency within the pass-band of the filters, pass down the cable through the filters, and can be received at the local remote terminal as will be described below.

In order to receive the transmitted R.F. signal on the second parallel cable, a capacitor 56 is connected to the center conductor of cable 8A, and is further serially connected with inductor 57 to one input of gated R.F. FET 58. The gate input is connected to a lead labelled RXA. Similarly the center conductor of cable 8B is connected via capacitor 59 and inductor 60 to the input of gated R.F. FET 61. The gate input of FET 61 is connected to a lead labelled RXB. The FETs are connected to a source of voltage −V through resistors 62 and 63 respectively, bypassed to ground through capacitors 64 and 65 in a conventional manner.

Capacitor 56 with inductor 57 and capacitor 59 with inductor 60 form series resonant circuits, which are resonant to the radio frequency signal to be received on cables 8A and 8B. FETs 58 and 61 both amplify and gate the input signals; for example a logic enable signal on lead RXA switches FET 58 on, thus allowing the signal received from cable 8A to pass through. This function is similarly performed by a logic enable signal applied to lead RXB, allowing the signal received from cable 8B to pass through FET 62.

The outputs of FETs 58 and 61 are connected together and their output signals pass through trimmer capacitor 66 to the input of FET amplifier 67. The output of FET amplifier 67 passes through trimmer capacitor 68 for reception by the down conversion circuitry of the receiver, i.e. a mixer.

FETs 58 and 61 are connected to power source +V through isolating inductor 69 connected in series with resistor 70, their junction being bypassed by capacitor 71. Similarly FET 67 is connected to power source +V through inductor 72 in series with resistor 73, their junction being bypassed by capacitor 74. The gate input of FET 67 is connected to power source +V through resistor 75, bypassed to ground through capacitor 76, thus retaining it permanently enabled.

Thus the transmitter and receiver are connected to cables 7A and 7B respectively by logic enable signals applied to the TXA and RXA leads, and are connected to cables 7B and 8B by the logic enable signals applied to leads TXB and RXB.

A local oscillator signal is derived from oscillator 31 or 32 for use by the mixer (to be described below) by connecting one input of NAND gate 77 to the output of NAND gate 33 and the second input of NAND gate 77 to +V. The output of NAND gate 77 is connected through capacitor 78 to a lead labelled LO.

FIG. 6 is a block diagram illustrating the preferred form of the detector and control portion of the remote terminal. The mixer lead connected to trimmer capacitor 68 (FIG. 5) is connected to one input of mixer 79, with the LO lead local oscillator signal to its local oscillator input. The resulting baseband signal is amplified in amplifier 80 and is passed through balancing amplifier 124 (to be described later) and low pass filter 81 to sample and hold circuit 82. The sample and hold circuit can include a capacitor which is charged up to the level of the received analog input signal, and is discharged when reset. Low pass filter 81 can be an active filter which itself is reset as the receiver switches to the A or B coaxial cable. The parameters of the filter can be set under control of the control unit, as will become evident later.

The output signal of sample and hold circuit 82 is connected to one input of multiplexer 83.

It was noted earlier that the alternating polarity of the power supply of the remote unit on the coaxial cables is used to effect switching of the transmitters and receivers between the A and B sides of the sectors. The center junctions of tee filters 26, connected to leads TX and RX (FIG. 5) are used as take off points to sense this polarity change. In FIG. 6 the TX and RX leads are connected together to a second input of multiplexer 83 via resistors 84 and 85.

A microprocessor, preferably of the type containing memory and an UART (universal asynchronous receiver-transmitter), such as type MC6801 which is available from Motorola Corp. is used as the main controller of the terminal. The clocking and other ancillary circuitry involving the microprocessor is well known and will not be described in detail. Microprocessor 86 outputs signals to buffer 87 and digital to analog converter 88, and receives signals from buffer 93.

The memory of microprocessor 86 should contain signals in firmware which cause switching of multiplexer 83 as between its two inputs. The switching control signals are stored in buffer 87 and are carried by conductor 89 to the channel control input of multiplexer 83. Conductor 89 may be formed of a plurality of leads to handle more than two input channels.

The baseband analog input signals from the receiver, stored in sample and hold circuit 82 are passed through multiplexer 83 during their appropriate time slots and are applied to one input of comparator 90. The output of comparator 90 is applied to microprocessor 86. The second input to comparator 90 is an analog output of digital to analog converter 88, which derives a digital signal for conversion to analog from microprocessor 86. With microprocessor 86 outputting a signal representative of a null or threshold level, which is indicative of the signal received from the received coaxial cable during no intrusions, a signal exceeding this level resulting from an intrusion causes an output from comparator 90. The microprocessor should access control signals stored in firmware to analyze the in-phase and quadrature received signals, derive a variation or intrusion signal, count intrusions and also to store a signal representative of the amplitudes in excess of the threshold. These signals can be used by the control unit to determine whether the intrusion detected is a random hit or an actual intrusion, and to estimate the parameters involved in the intrusion.

It will be understood that during reception of the R.F. signal from the receive coaxial cable, during a non-intrude period, significant noise (clutter) is received. The microprocessor filters this data, striking an average signal. This average signal is fed back to balancing amplifier 124A, via a summing amplifier 125. The summing amplifier generates a clutter compensation signal from both cables as presented to it by microprocessor 86 through digital to analog converter 88. Consequently balancing amplifier 124A nulls the normal fixed "background" portion of the incoming input signal. It is preferred that the time constant for the averaging should be long, e.g. approximately 80 seconds. Standard digital filtering algorithms can be used to generate the average. The parameters of the filtering can be changed upon reception of suitable data signals from the control unit.

It should be noted that the thresholds are set by means of local potentiometers which have outputs (not shown) connected to multiplexer 83. In this case lead 89 will consist of more than one actual conductor in order to enable it to multiplex more than two inputs. The microprocessor senses the background "clutter" which is removed by subtraction in the balancing amplifier 124A. The analog sensor data is converted to digital samples via a microprocessor controlled analog to digital conversion process via the D/A88 and comparator 90 as described earlier. Threshold values can be transmitted to the control unit as part of the return data.

The power signal also passes via the TX and RX leads into multiplexer 83, which signal is passed during its appropriate time slots. This signal is also fed into microprocessor 86, which senses the timing of its polarity change. This signal passes through comparator 90 in a manner similar to the R.F. signal described above.

Data signals from the control unit are also received via the TX and RX leads and are passed to the microprocessor as will be described below, via a comparator 124. In a successful prototype, the (asynchronous 9600 Baud) data signals consisted of a 153.6 kilohertz sinusoidal carrier with 16 cycles per bit period.

The microprocessor 86, in conjunction with a data decoder and a data generator 91, under control of a sequence of control signals stored in the microprocessor firmware, decodes the data signals received from the coaxial cable and generates signals at a similar rate for transmission back to the control unit via the transmitter and cable described earlier. Decoding and generation of data signals is well known and need not be described in detail here. The preferred form of the signals will be described below.

The detection of a terminal address data signal is performed in a well known and conventional manner. A plurality of coding switches 92 have one terminal in common connected to ground and the other terminals connected to separate inputs of buffer 93. Those terminals are also connected to supply voltage +V through resistors 94. Buffer 93 has its output connected via a bus to microprocessor 86.

Microprocessor 86 also has an output bus connected to the input of buffer 87. Outputs of buffer 87 are connected to the I/Q lead and to the I/Q lead through inverting gate 95, to the TXA and TXB leads through inverting gates 96 and 97 respectively, and to the RXA and RXB leads through transistors 98 and 99 respectively. In the latter case, the appropriate output of buffer 87 is connected to the base of transistor 98 through resistor 100 and to the base of transistor 99 through inverter 101 and resistor 102. The RXA lead is connected to the collector of transistor 98 through a gain control potentiometer 103 and lead RXB is connected to the collector of transistor 99 through a gain control potentiometer 104.

External sensor devices and other peripheral devices are driven and sensed as follows. Drive point leads 105 are connected to a plurality of outputs of buffer 87, and external device signals are received at terminals 106A of buffer 93. Accordingly external devices can be enabled by the use of drive points 105 under control of microprocessor 86 having received address and control signals from the control unit, and signals received from remote sensors can be detected on leads 106A by microprocessor 86 accessing them through buffer 93.

It is preferred that buffers 87 and 93 should be a multiple tristate buffer of well known construction.

To transmit data on the cables, a transmit enabling signal is applied to the send S output, and 9600 Baud data is generated by the UART of microprocessor 86. This is applied to one input of NAND gate 106, and through inverting gate 107 to one input of NOR gate 108. The other input of gates 106 and 108 are connected together to the output of the 153 kilohertz oscillator portion of decoder and generator 91.

The outputs of gates 106 and 108 are connected through resistors 109 and 110 to the base inputs of NPN power transistor 111 and PNP power transistor 112 respectively. The collectors of transistors 111 and 112 are connected together through resistors 113 and 114. The emitter of transistor 111 is connected to ground and the emitter of transistor 112 is connected to voltage source +V through decoupling inductor 115 which is bypassed to ground through capacitor 116.

The junction of resistors 113 and 114 are connected to the TX and RX leads through inductors 117 and 118 respectively. A small capacitor 119 is connected across the external terminals of the inductors. The external terminal of inductor 118 is connected to the TX lead through capacitor 120 and resistor 121 connected in series while the external terminal of inductor 117 is connected to the RX lead through capacitor 122 and resistor 123 in series. Capacitor 120 with inductor 118 and capacitor 122 with inductor 117 form a resonant circuit at the carrier frequency of 153.6 kilohertz.

The data generator 91 generates tone at 153.6 kilohertz which is applied to one of the two inputs of gates 106 and 108. Data pulses appearing on the TDAT lead of the UART of microprocessor 86 being applied as provided and in inverse to the second inputs of gates 106 and 108 respectively causes the data pulses to modulate the 153 kilohertz tone, effectively driving transistors 111 and 112 in push-pull. The resulting output signal is applied to the TX and RX leads which, as was described earlier with reference to FIG. 5, are connected to the center junctions of tee filters 26. In this manner the data signals from the remote terminal are applied to the coaxial cables for reception by the control unit.

Receive operation is enabled by putting the S lead enable state opposite to that for transmitting, in which case, a comparator 124 senses incoming 153.6 kiloherz carrier. The data decoder 91 decodes the resultant pulses from the comparator 124 and decodes it so as to present 9600 Baud asynchronous incoming data via the RDAT lead to the UART of the microprocessor.

Thus it may be seen that the remote terminal transmits data to the control unit on both cables. Similarly the remote terminal receives data signals from both cables via the RX and TX leads, effectively summing the signal from both cables. However it is preferred that the control unit should transmit on one of the cables, and should receive from one of the cables. In this way redundancy is achieved in case one of the cables is damaged.

It is preferred that the data rate should be 9,600 baud with a mark being formed of a zero signal level on the center conductor of the coaxial cable, and a space being formed of 153 kilohertz (16 carrier cycles per bit).

While circuitry for the detection of address and data signals and the transmission of data signals at the remote terminal has been described, and since the formulation of control signals for storage in the microprocessor firmware memory is performed conventionally, a better understanding of the preferred form of the signalling will facilitate easier formulation of algorithms for the preparation of the control signals and will be described below.

As shown in FIG. 7, the preferred form of power is shown as waveform A, being composed of alternating pulses of power. The two waveforms shown in A are the opposite phases carried by the center conductors of the two coaxial cables. The transition points A and B shown in FIG. 7 provide the timing for the microprocessor to cause enabling signals on the TXA and TXB leads, and RXA and RXB leads to reverse the transmitter and receiver transmission directions alternating between cables 7A and 8A, and 7B and 8B. Consequently at every power transition a phase locked loop in the microprocessor is updated, and this enables all the terminals to synchronize the sequence of their 40 megahertz intruder detection signals.

Within the time of transmission and reception in a particular direction (referred to herein as a frame), we can consider two different proceedings: (a) data reception and generation (processing), and (b) intruder detection and signal analysis. According to the preferred embodiment of this invention, considering the data processing first, following a debounce or transient settling period following each transition time A, illustrated by timing diagram C, the control unit transmits a signal to all remote terminals during three successive channel intervals, i.e., sending three bytes of data. After the control unit has completed sending the three bytes an addressed remote terminal transmits data during eleven channel intervals (i.e. eleven bytes) to the coaxial cable. Shown as waveform B are the 3 initial bytes, each formed of 8 bits, which are presented to each remote terminal, having passed down the entire coaxial cable through the RF decouplers, and having been received via the RX or TX lead as described earlier. Following reception of the 3 bytes, the addressed remote terminal transmits 9 bytes shown in timing diagram C back to the coaxial cable for reception by the control unit.

It is preferred that the first of the 3 bytes transmitted by the control unit should contain a 4 bit address, which would specify 1 out of 16 remote terminals, followed by 2 bits which are reset flags, and which may be used to reset the digital filters used in the remote terminal, followed by a spare bit, followed by a single bit which specifies which of two data subframes should be sent back in response. The second byte should consist of 8 bits which cause application of signals to the enable leads 105 (FIG. 5) connected to external sensors or apparatus. These 8 bits can be a test command, or other control flags, to other sensors. The third transmitted 8 bit byte is a check sum which should be used by the local microprocessor to determine the reliability of the received signal in a well known manner.

As noted above, one of two types of data subframes can be specified to be returned by the remote terminal which is addressed, each of which has as its last byte a check sum. The first two bytes in one type of data frame to be returned, specifies magnitude, as compared to the threshold described earlier. The second two bytes should specify the number of events or "hits" above the threshold which have been recorded. The next two bytes should specify what the threshold is set at, in order that the control unit can make independent comparison and thereby make a decision whether or not to declare an intrusion alarm. The next byte contains the system flags, and the following byte contains data relating to or received from the external or peripheral sensors or apparatus. For one switch closure per external sensor, for example, and 8 external sensors, each bit in the scan point byte can indicate whether or not an external sensor is in alarm. The last bit should be a check sum, derived in a well known manner for determination by the control unit that the data is valid.

The second form of data subframe can be used for various purposes. For example it can be used for test purposes, transmitting the measurements of an RF loop-around test which may have been initiated, the balancing magnitudes of the system, the power voltage at the remote terminal, etc. Alternatively, the second form of data returned can be data received from outside sensors or from a data signal generator which data is to be transmitted by the secure link to the control unit, for example.

The system flags can indicate whether the remote terminal is in synchronism, can provide a count of rebalancing adjustments as it progresses under control of the control terminal, etc.

Returning now to FIG. 7, timing diagram D shows the channel timing within the remote terminal. During interval IB, an in-phase CW radio frequency signal is transmitted on B side coaxial cable, cable 7B. During the interval QB, a quadrature shifted CW radio frequency signal is transmitted to the same cable. During the interval IA the in-phase signal is transmitted on the A side cable, e.g. cable 7A, while during the interval QA the quadrature shifted radio frequency signal is transmitted on the same cable. During the intervals NB and NA, nothing is transmitted, the time being used for integration, and auto nulling to compensate for drift in the D.C. coupled base band amplifiers. The intervals TEST are used by the microprocessor to encode the threshold potentiometer voltages, power voltage, and other general tests.

Timing diagram E shows the actual processing intervals, which are shifted later by one timing interval. During a particular transmit period, the microprocessor should be involved in calculating the received data from the previous channel interval; for example, when the in-phase radio frequency signal is applied to the A side cable during the interval IA, the microprocessor is processing the signal received from the immediately previously transmitted period of the quadrature component on the B cable, QB.

The details of the analysis of the in-phase and quadrature components of the received signals for sensing of an intrusion need not be described in detail herein since the principles are well known.

Turning now to FIG. 8, the block diagram of a control unit for use in the invention is shown. A central processing unit CPU 126 is connected in a conventional manner to a bus system 127, with ROM 128 and RAM 129 memories. An UART 130 also is connected to the bus and to a cathode ray tube terminal which can have a keyboard or pushbutton control 131, of conventional construction. A data link interface 132 is also connected to the bus system, and is also connected to coaxial cable connectors 133 and 134 for connection to RF decouplers connected to the two coaxial cables of the system.

A power supply 135 serially connected to an inverter 139 supply the alternating power pulses at 18-⅓ hertz, preferably at 60 volts, which pass through blocking filters 136 and 137. Filters 136 and 137 are designed prevent shorting of the 153.6 kilohertz data link by the power supply. Inverter 139 converts 60 volts D.C. received from the power supply to an 18-⅓ kilohertz, 60 volt square wave for powering to the coaxial connectors 133, 134. The 18-⅓ kilohertz frequency is generated by the CPU 126.

RAM memory 129 preferably contains stored signals which generate a map of the area or line to be protected on CRT terminals 131, under control of CPU 126, in a well known manner. ROM 128 contains the operation control signals for use by CPU 126. A battery regulator 138 has its output current diode fed to the RAM input in order to retain its data during power down conditions.

In operation, CPU 126 continuously generates three 8 bit bytes as described with reference to timing diagram B of FIG. 7. As noted, the first four bits of the first byte contains the address of one of the remote terminals. The generated address of course indexes to the next remote terminal address each time the first, or polling byte is generated or transmitted. The entire three bytes in the form described earlier pass through interface 132 and are applied to one of the two cables connected to the connectors 133 and 134.

Upon reception of the return data from the addressed remote terminal, via connectors 133 and 134, the signals are passed to bus 127 through interface 132. The CPU analyzes the data and refreshes the map shown on CRT terminal 131 by applying the appropriate data signals through UART 130.

Alternatively, the CRT display can be a "smart terminal" continuously accessing the map signals stored in RAM 129 and refreshing itself. In that case CPU 126 need only send "exceptional" data to the CRT terminal, such as to set off an alarm signal, to change the color of a segment, etc.

The control module also can contain additional UARTS 140 connected to bus 127 for interfacing an optional printer and a spare RS232 port.

With data received from each polled remote terminal, the CPU updates the data which forms each segment of the map. The technique for generation of the map information and initiation of an alarm is known, and is not the subject of the present invention.

The system described above has significant advantages over the prior art systems. Since a CW signal is used, a very small bandwidth signal can be used, thus minimizing noise and enhancing reliability of sensing. Various sector lengths can be used, thus allowing the system great versatility. Since the lengths are abutted various line length systems can be designed using standardized and thus minimum cost equipment. Separate power and data distribution networks are not required, since both power and data is transmitted down the same cables used for sensing. Thus the system can provide a secure power and data transmission link to other sensors or equipment. Further, if damage occurs to one cable, the entire system is not shut down, but only one small segment is disabled. Power and data transmission to the remaining sectors continues, since one cable and ground can serve as the required circuit.

A person skilled in the art understanding this invention may now conceive of other embodiments or variations thereof, using the principles described herein. All are considered to be within the sphere and scope of this invention as defined in the claims appended hereto.

We claim:

1. An intrusion detector comprising:

(a) a pair of spaced leaky coaxial cables, (b) at least one pollable terminal connected to first adjacent ends of the cables, for receiving and/or transmitting digital data signals along one or both of said cables, (c) control means connected to the other adjacent ends of the cables for polling said terminal or terminals and for transmitting to and/or receiving digital data signals from the terminal or terminals along one or both of said cables, (d) means for applying a CW radio frequency signal to one of said cables, (e) means for receiving the radio frequency signal from the other of the cables, and (f) means for detecting predetermined variation in the received signal from said other cable, whereby the approach of a body to the vicinity of said cables causing said variation in the received radio frequency signal can be determined, thereby providing warning of a possible threat to the transmission of said data signals.

2. An intrusion detector as defined in claim 1 further including means at said terminal for receiving signals from external auxiliary signal generating means, and for applying the auxiliary generated signals to said one or both cables as at least part of said data signals, and means associated with the control means connected to said other ends of the cables for receiving said auxiliary generated signals.

3. An intrusion detector as defined in claim 2 further including means at said terminal for receiving a polling signal along one or both of said cables from the control means, and means at said terminal for transmitting the auxiliary signal to the control means in response to the reception of the polling signal containing an address indicative of said terminal.

4. An intrusion detector as defined in claim 1 in which said terminal includes the detecting means, means for applying data signals designating detection of said predetermined variation in the received signal to said one or both cables as at least part of said data signals, means for receiving a polling data signal from one or both of said cables from the control means, and means for transmitting the data signals designating detection of said predetermined variation to the control means for translation thereof in response to reception of a polling signal indicative of said terminal.

5. An intrusion detector as defined in claim 4 further including means at the terminal for receiving signals from one or more auxiliary signal generating means, means for applying the generated auxiliary signals to said one or both cables as at least part of the data signals, and means for transmitting the generated auxiliary signals to the control means in response to reception by the terminal of said indicative polling signal.

6. An intrusion detector as defined in claim 1, 2 or 4 including means connected to said other ends of the cables for applying operating power for the terminal thereto, and means at the terminal for receiving said operating power.

7. An intrusion detector as defined in claim 1, 2 or 4 in which the cables are buried, and including means connected to said other ends of the cables for applying alternating polarity power pulses thereto at a frequency different from a submultiple of standard power mains frequency for operation of the terminal, and means at the terminal for receiving and rectifying said operating power pulses.

8. An intrusion detector as defined in claim 2, 3 or 5 including means connected to said other ends of the cables for applying to the ends of the cables operating power for the terminal and the auxiliary signal generating means, and means at the terminal for receiving said operating power.

9. An intrusion detector as defined in claim 2, 3 or 5 in which the cables are buried, and including means connected to said other ends of the cables for applying thereto alternating polarity power pulses at a frequency different from a submultiple of standard power mains frequency, and means at the terminal for receiving and rectifying said operating power pulses to provide DC power to the terminal and/or the auxiliary signal generating means.

10. An intrusion detector as defined in claim 1, 2 or 3 in which the radio frequency signal applying means and the receiving means are connected to said cables at said other ends thereof.

11. An intrusion detector as defined in claim 1, in which the radio frequency signal applying means and the receiving means are connected to said cables at said first ends thereof.

12. An intrusion detector comprising:

(a) a control unit, (b) a plurality of remote terminals spaced along a line to be protected, each of said terminals including a radio frequency transmitter and receiver, (c) a pair of coupled leaky coaxial cable means associated with each terminal, one connected to the transmitter and one connected to the receiver, (d) means at each terminal for detecting a predetermined variation in a transmitted signal received at the receiver via the cable means caused by the intrusion of a body adjacent the cable means changing the coupling therebetween, and for generating an intrusion detection signal in response thereto, each said receiver, transmitter and pair of cable means forming a sector intrusion detector, (e) means for connecting the cable means serially at each of said terminals, between each of the sector detectors, and to the control unit along said line to be protected, said connecting means including radio frequency decoupling means, (f) means for receiving a data signal from the control unit via the cable means and decoupling means, which signal includes a remote terminal address, and (g) means at each remote terminal for detecting a predetermined remote terminal address and for applying the intrusion detection signal to the cable means for passage through said decoupling means and reception by the control unit upon said address matching said predetermined address.

13. An intrusion detector as defined in claim 12 in which the cable means is comprised of two pair of graded, leaky coaxial cables, the cables of each pair being located in parallel relationship and connected serially with the other pair along said line to be protected, means for switching each transmitter and receiver together to alternate adjacent ends of each pair of the two pair of cables.

14. An intrusion detector as defined in claim 13 in which each said decoupling means is comprised of a low pass filter.

15. An intrusion detector as defined in claim 12, 13 or 14 in which the transmitted signal is a CW signal of above 10 megahertz frequency.

16. An intrusion detector as defined in claim 12, 13 or 14 in which the control unit includes means for applying operating power for the remote terminals to the cable means, said power passing to all said terminals through said decoupling means.

17. An intrusion detector as defined in claim 13, in which the control unit includes means for applying low frequency alternating power pulses to at least one of the coaxial cables, said power pulses passing through said decoupling means to all said terminals, and including means at said terminals for rectifying said pulses to obtain operating power thereby.

18. An intrusion detector as defined in claim 17, further including means in all said terminals for synchronously and alternatingly switching said transmitters and receivers to pairs of cables leading in one direction and to the reverse direction in response to polarity changes in said power pulses.

19. An intrusion detector as defined in claim 12, 17 or 18 further including means for connecting external data generating means to at least one of the terminals, and means for applying an external data signal from the external data generating means to the coaxial cable means following reception of said address matching said predetermined address at said at least one of the terminals, for reception and translation at the control unit.

20. An intrusion detector as defined in claim 12, 17 or 18 further including means for connecting external sensors to at least one of the terminals, and means for applying sensor detect data signals to the coaxial cable means following reception of said address matching said predeterined address at said at least one of the terminals, for reception and translation at the control unit.

21. An intrusion detector as defined in claim 17, 18 or 19 including means at each remote terminal for detecting said address signal following each change in polarity of said power pulses, and for applying said intrusion detection signal following detection of said matching address signal.

22. An intrusion detector as defined in claim 12 further including means connected to the control unit for receiving the intrusion detection signal and providing an indication of an intrusion detected within a particular sector in response to the reception of the intrusion detection signal.

23. An intrusion detector comprising:

(a) serially connected CW type leaky coaxial cable intrusion detectors comprising pairs of parallel, buried leaky coaxial cables, the cables of each detector being connected to but isolated from those of an adjacent detector by RF decoupling means, each detector having a centrally connected control terminal, (b) a control unit connected to the serial intrusion detectors through RF decoupling means, (c) said control unit including means for applying alternating pulses of power to the leaky coaxial cable of said detectors at a frequency different from a submultiple of standard power mains frequency, (d) means at each control terminal for rectifying said power to obtain DC operating power thereby, and (e) means at each control terminal for receiving an address signal from the coaxial cable applied thereto by the control unit, and for applying an intrusion signal to the coaxial cable following detection of a predetermined address signal unique to each control terminal, in the event of detection of an intrusion by the addressed detector.

24. An intrusion detector as defined in claim 22, including means at each terminal for detecting said address signal following each change in polarity of the power pulses, and for applying the intrusion signal to the cable following detection of the predetermined address signal unique to each control terminal.

25. An intrusion detector comprising:

(a) serially connected leaky coaxial cable intrusion detectors, each connected to but isolated from an adjacent detector by RF decoupling means, each detector having a centrally connected pollable control terminal, (b) a control unit connected to one end of the serial intrusion detectors through RF decoupling means including means for polling each control terminal, (c) means for transmission of intrusion signals from each control terminal to the control unit via the coaxial cable through the RF decoupling means, and (d) means for transmitting and receiving digital data signals along said coaxial cable through the decoupling means upon polling by the control unit, to form an intruder-secure data link.

* * * * *